US011725700B2

(12) United States Patent
Constable-Berry et al.

(10) Patent No.: US 11,725,700 B2
(45) Date of Patent: Aug. 15, 2023

(54) FRICTION CLUTCH

(71) Applicant: A.P. RACING LTD, Coventry (GB)

(72) Inventors: David James Constable-Berry, Coventry (GB); Jonathan David Grant, Coventry (GB)

(73) Assignee: A.P. RACING LTD, Coventry (GB)

( * ) Notice: Subject to any disclaimer, the term of this patent is extended or adjusted under 35 U.S.C. 154(b) by 15 days.

(21) Appl. No.: 17/609,142

(22) PCT Filed: May 4, 2020

(86) PCT No.: PCT/IB2020/054208
§ 371 (c)(1),
(2) Date: Nov. 5, 2021

(87) PCT Pub. No.: WO2020/225706
PCT Pub. Date: Nov. 12, 2020

(65) Prior Publication Data
US 2022/0213934 A1 Jul. 7, 2022

(30) Foreign Application Priority Data

May 7, 2019 (GB) ...................................... 1906408

(51) Int. Cl.
*F16D 13/71* (2006.01)
*F16D 13/58* (2006.01)
(Continued)

(52) U.S. Cl.
CPC ........... *F16D 13/585* (2013.01); *F16D 13/71* (2013.01); *F16D 13/385* (2013.01); *F16D 2013/706* (2013.01); *F16D 2300/26* (2013.01)

(58) Field of Classification Search
CPC ...... F16D 13/585; F16D 13/71; F16D 13/385; F16D 2013/586; F16D 2013/706; F16D 2300/26
See application file for complete search history.

(56) References Cited

U.S. PATENT DOCUMENTS 4,531,622 A * 7/1985 Bacher .................... F16D 13/71
192/109 R
5,022,508 A * 6/1991 Fukuda ................. F16D 13/585
192/70.27
(Continued)

FOREIGN PATENT DOCUMENTS

EP  1477697 A2  11/2004
FR  3067422 A1  12/2018

OTHER PUBLICATIONS

European Patent Office, International Search Report with Written Opinion, issued in PCT/IB2020/054208, dated Jul. 20, 2020, 11 pages, European Patent Office, Rijswijk, Netherlands.
(Continued)

*Primary Examiner* — Huan Le
(74) *Attorney, Agent, or Firm* — Marshall & Melhorn, LLC

(57) ABSTRACT

A clutch cover for a friction clutch and a friction clutch, where the clutch cover forms a ring wall and the ring wall forms a plurality of circumferentially spaced radially extending plates having each a radially outer end. The ring wall also form two or more concentric annular stiffening bands extending at a radial distance from one another and including an innermost annular stiffening band. The ring wall also forms an outermost annular stiffening band, wherein the annular stiffening bands connect the radial plates to each other and having each a radial thickness that is smaller than the radial distance therebetween measured in intermediate regions of the ring wall between respectively two successive radial plates. A plurality of circumferentially spaced drive members of the friction clutch protrude axially from or can be screw connected to said radially outer ends of the radial plates.

19 Claims, 8 Drawing Sheets

Figure 1:
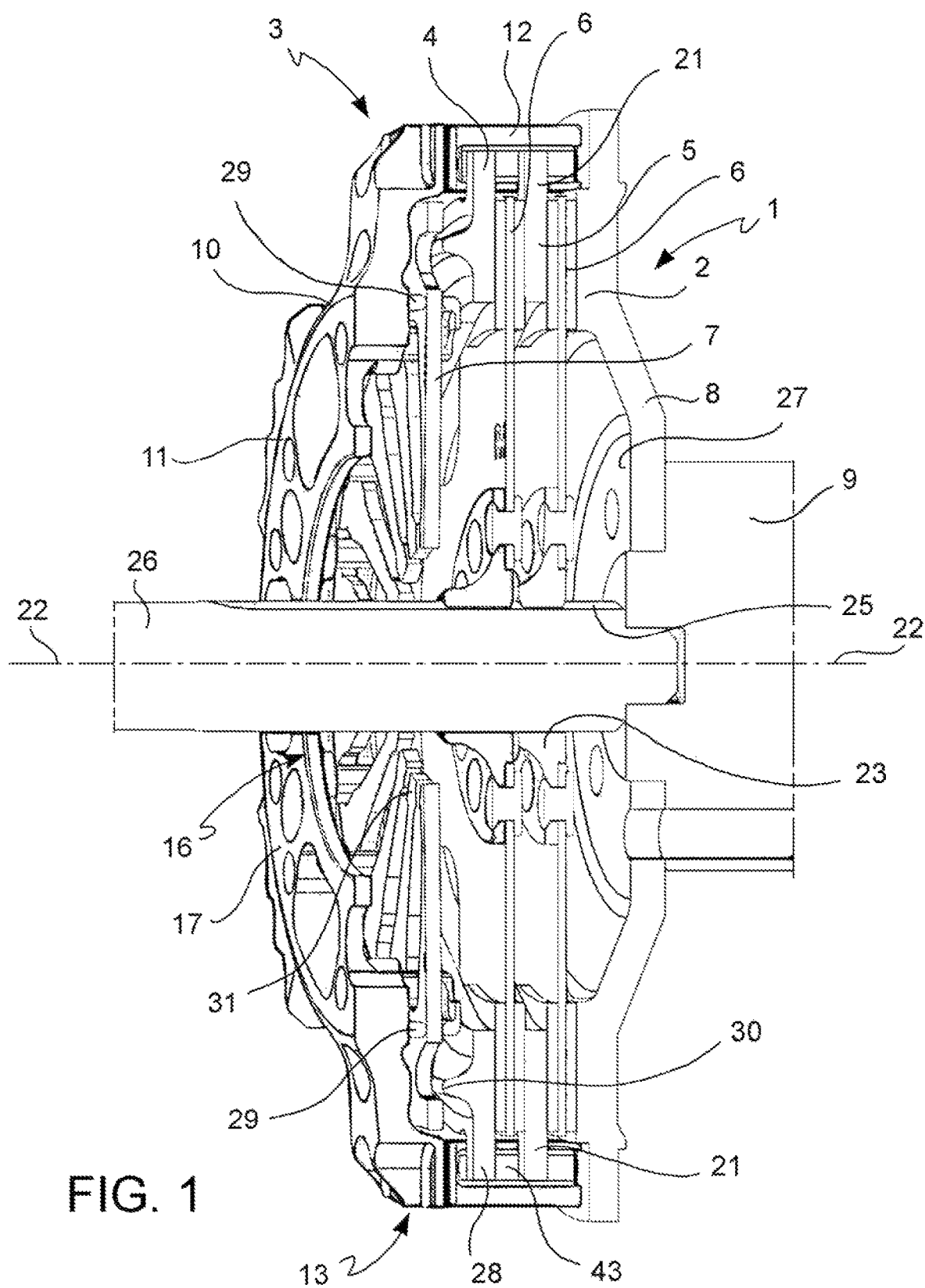

(51) Int. Cl.
   *F16D 13/38*   (2006.01)
   *F16D 13/70*   (2006.01)

(56) References Cited

U.S. PATENT DOCUMENTS 5,950,786 A * 9/1999 Mahoney ................ F16D 13/71
                                                     192/70.27
9,562,571 B2 * 2/2017 Fuenfgeld ............... F16D 13/40

OTHER PUBLICATIONS

Jeremy B. Govan, CP8642 Clutch Family, Jan. 31, 2014, A1 Installation Drawings (2 pages), XP055715750 Bibliographic Data Sheet (1 page), AP Racing, Wheler Road, Coventry, CV3 4LB United Kingdom.

Jeremy B. Govan, CP8742 Clutch Family, Feb. 22, 2019, A1 Installation Drawings (3 pages), XP055715789 Bibliographic Data Sheet (1 page); AP Racing, Wheler Road, Coventry, CV3 4LB United Kingdom.

David Constable-Berry, CP8732 Clutch Family, Nov. 29, 2019, A1 Installation Drawings (2 pages), XP055715744 Bibliographic Data Sheet (1 page), AP Racing, Wheler Road, Coventry, CV3 4LB United Kingdom.

Tilton Racing, Ultra 5.5 Clutch Assemblies, Nov. 26, 2019, XP055715802 Bibliographic Data Sheet 1 page), Ultra 5.5 Clutch Assemblies Catalog Sheet (1 page), Tilton Racing, Buellton, California, USA.

ZF Race Engineering GmbH, "The Best for the Best! ZF Race Engineering—Innovative Services and Technologies for Motorsports and the Automotive Future", Feb. 3, 2020, XP055716305 Bibliographic Data Sheet (1 page), ZF Race Engineering Brochure (32 pages), ZF Race Engineering GmbH, Schweinfurt, Germany.

* cited by examiner

FRICTION CLUTCH

This invention relates to a clutch cover for a friction clutch and to a friction clutch for motor vehicles. In particular, but not exclusively, this invention relates to a clutch cover and to a friction clutch for use in cars, more particularly high performance and/or racing cars.

In a typical motor vehicle friction clutch, one or more friction plates are positioned in a clutch housing between a pressure plate that is axially displaceable with respect to the clutch housing and a counter-pressure member or reaction plate that is formed by the clutch housing or fixed to the clutch housing. The counter-pressure member is often configured as a flywheel but this is not always the case. The counter-pressure member and pressure plate, and hence the clutch housing, are usually in driving (torque) connection with an output shaft of the engine of the motor vehicle and rotate about a common axis with the engine output shaft. One or more of the friction plates are usually in driving (torque) connection with a clutch output shaft, which typically forms or connects to an input shaft of a gearbox of the motor vehicle.

A prestressed diaphragm spring acts between the clutch housing and the pressure plate for permanently elastically biasing the pressure plate towards the counter-pressure member in order to clamp the friction plates between the pressure plate and the counter-pressure member, thereby engaging the friction clutch, i.e. torsionally connecting the engine output shaft to the gearbox input shaft.

The diaphragm spring generated force clamping the friction plates is referred to as the "clamp load" and the magnitude of the clamp load influences the amount of torque that can be transmitted through the clutch. The actual clamp load applied to the friction plates when the clutch is engaged or partially engaged depends on the force applied to the pressure plate by the diaphragm spring less any forces acting in the opposite direction. In some known clutches, spacer springs are provided for biasing the pressure plate away from the flywheel to ensure a clean disengagement of the friction clutch. In clutches of this type the effective clamp load will be substantially equal to the force applied to the pressure plate by the diaphragm spring less the elastic force of the spacer springs which acts in the opposite direction.

Disengagement of the known friction clutch is controlled by a release bearing arranged coaxially around the clutch output shaft and axially positionable along the clutch output shaft in:
  a rest position in which the release bearing doesn't engage the diaphragm spring and doesn't influence the diaphragm spring force biasing the pressure plate towards the counter-pressure member,
  a working position in which the release bearing engages and fully deforms the diaphragm spring to minimize or reduce to zero the diaphragm spring force biasing the pressure plate towards the counter-pressure member,
  a range of intermediate positions in which the release bearing engages and partially deforms the diaphragm spring to adjust the diaphragm spring force biasing the pressure plate towards the counter-pressure member.

When a friction clutch is fully engaged, substantially the entire diaphragm spring force is applied to the pressure plate to clamp the friction plates.

When a clutch is only partially engaged (or in other words: only partially disengaged), part of the diaphragm spring force is taken by the release bearing and only a proportion of the available spring force is applied to the pressure plate to clamp the friction plates.

When a friction clutch is held in such a partially engaged condition, the friction plates (i.e. driving friction plates and driven friction plate/s) are not fully clamped and so slip relative to one another with a certain amount of frictional resistance.

Known diaphragm springs are conical and the spring force produced by a diaphragm spring usually varies in a non-linear manner in dependence on its cone angle. Many clutches are configured so that the cone angle of the diaphragm spring when the clutch is engaged and the friction plates are new is such that the diaphragm spring force is just below its peak value. As the friction plates wear, the cone angle of the diaphragm spring when the clutch is engaged increases leading initially to an increase in the spring force until it passes its peak value, after which further increases in the cone angle as the friction plates continue to wear results in a reduction of the diaphragm spring force.

A known clutch housing comprises a radially extending annular plate member (e.g. configured as flywheel), a clutch cover positioned opposite to the annular plate member and a plurality of circumferentially spaced drive members extending axially from an outer diameter region of the clutch cover, with the free ends of the axially extending drive members secured to the annular plate member. The annular plate member is in driving engagement with the output shaft of the engine, so that the clutch housing rotates together with the engine output shaft.

The design of the prior art clutch housings is a yet unsatisfactory compromise between a possibly very stiff (but heavy) design for minimizing undesired axial clutch housing length variations under load, which are known to alter the diaphragm spring force and hence negatively influence the clutch controllability, e.g. during launches of a vehicle, and a possibly very lightweight (but less stiff) design for minimizing the clutch mass and inertia which are known to limit the overall energy efficiency of the torque transmission through the clutch.

It is an objective of the present invention to provide an improved friction clutch which overcomes, or at least mitigates, the disadvantages of the prior art clutches.

It is also an objective of the invention to provide an improved friction clutch having a clutch housing with reduced mass and therefore some overall performance gain for the vehicle.

It is a further objective of the invention to provide an improved friction clutch having a clutch housing with increased stiffness of the clutch cover for a given mass of the clutch housing, in order to gain a greater degree of tuned axial compliance to be accommodated within the clutch housing to offer improved controllability during launches of the vehicle.

These and other advantages are obtained by a friction clutch according to claim 1. The dependent claims relate to preferred and advantageous embodiments.

In accordance with an aspect of the invention, there is provided a friction clutch comprising:
  a counter-pressure member,
  a clutch housing rotationally fixed with the counter-pressure member,
  a pressure plate rotationally fixed with the clutch housing but movable in an axial direction of the friction clutch relative to the clutch housing,
  at least one friction plate between the pressure plate and the counter-pressure member,
  at least one clutch spring operative between the clutch housing and the pressure plate to urge the pressure plate towards the counter-pressure member so as to clamp the at least one friction plate between the pressure plate and the counter-pressure member, in which the clutch housing comprises:
a radially extending annular plate member intended to be coupled in driving engagement with the output shaft of an engine,
a clutch cover forming a radially extending ring wall positioned opposite to the annular plate member and a plurality of circumferentially spaced drive members extending axially from a radially outer region of the ring wall towards the annular plate member, wherein free ends of the axially extending drive members are secured to the annular plate member, in which the ring wall forms:
a plurality of circumferentially spaced radially extending plates having each a radially outer end,
two or more concentric annular stiffening bands extending at a radial distance from one another (with respect to the clutch axis) and including an innermost annular stiffening band and an outermost annular stiffening band, said annular stiffening bands connecting said radial plates to each other and having each a radial thickness that is smaller than the radial distance therebetween measured in intermediate regions outside said radial plates, wherein said drive members protrude axially from said radially outer ends of the radial plates.

In accordance with a further aspect of the invention, there is provided a friction clutch comprising:
a counter-pressure member,
a clutch housing rotationally fixed with the counter-pressure member,
a pressure plate rotationally fixed with the clutch housing but movable in an axial direction of the friction clutch relative to the clutch housing,
at least one friction plate between the pressure plate and the counter-pressure member,
at least one clutch spring operative between the clutch housing and the pressure plate to urge the pressure plate towards the counter-pressure member so as to clamp the at least one friction plate between the pressure plate and the counter-pressure member, in which the clutch housing comprises:
a radially extending annular plate member intended to be coupled in driving engagement with the output shaft of an engine,
a clutch cover forming a radially extending ring wall positioned opposite to the annular plate member,
a plurality of circumferentially spaced drive members extending axially from a radially outer region of the annular plate member towards the ring wall, wherein free ends of the axially extending drive members are secured to the ring wall, in which the ring wall forms:
a plurality of circumferentially spaced radially extending plates having each a radially outer end,
two or more concentric annular stiffening bands extending at a radial distance from one another (with respect to the clutch axis) and including an innermost annular stiffening band and an outermost annular stiffening band, said annular stiffening bands connecting said radial plates to each other and having each a radial thickness that is smaller than the radial distance therebetween measured in intermediate regions outside said radial plates, wherein said drive members protrude axially from said radially outer ends of the radial plates.

The thus configured clutch has an increased stiffness of the clutch cover and clutch housing for a given mass, hence improving controllability of the clutch operation during launches of the vehicle.

On the other hand, the proposed configuration of the clutch cover and clutch housing achieves a reduction of their mass for a given required clutch housing stiffness and therefore an overall performance gain for the vehicle.

In accordance with a further aspect of the invention, there is provided a motor vehicle comprising a friction clutch in accordance with the first aspect, an engine and a gearbox, in which the clutch housing is rotationally fast with an output shaft of the engine and at least one friction plate is drivingly connected with an input shaft of the gearbox.

These and other features and advantages of the present invention shall be made apparent from the accompanying drawings which illustrate embodiments of the invention, and, together with the general description of the invention given above, and the detailed description of the embodiments given below, serve to explain the principles of the present invention.

Figure 2:
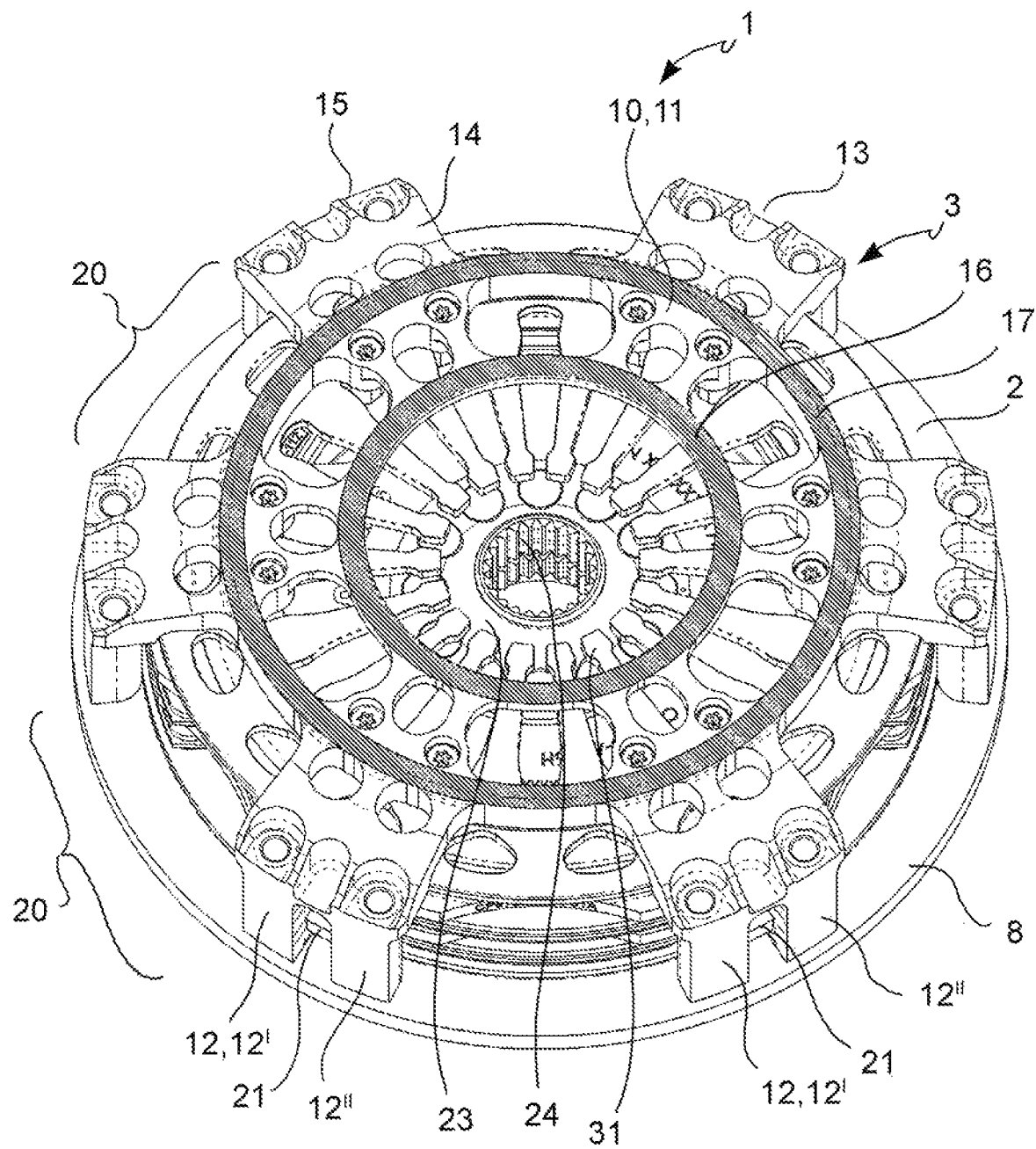
Figure 3:
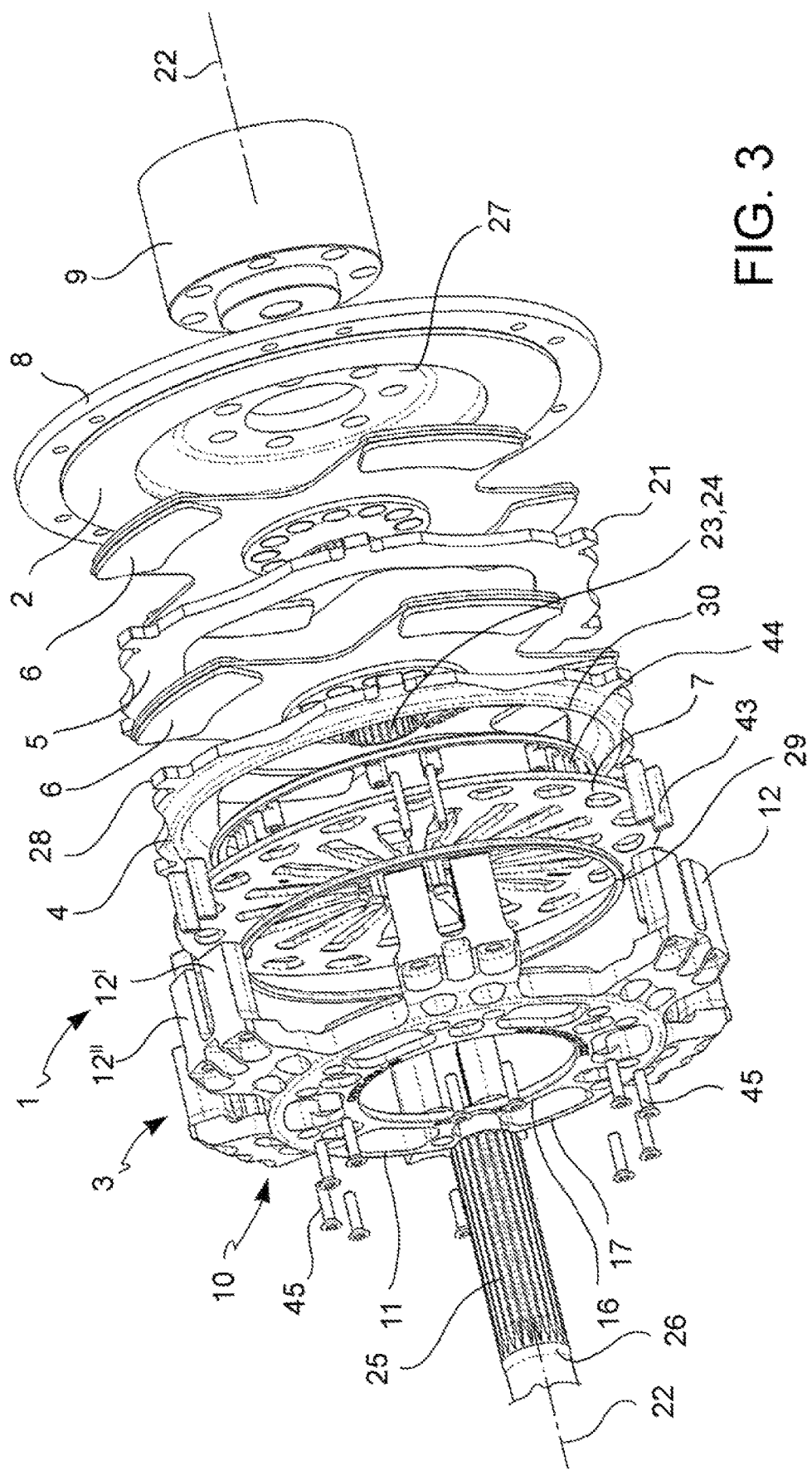
Figure 4:
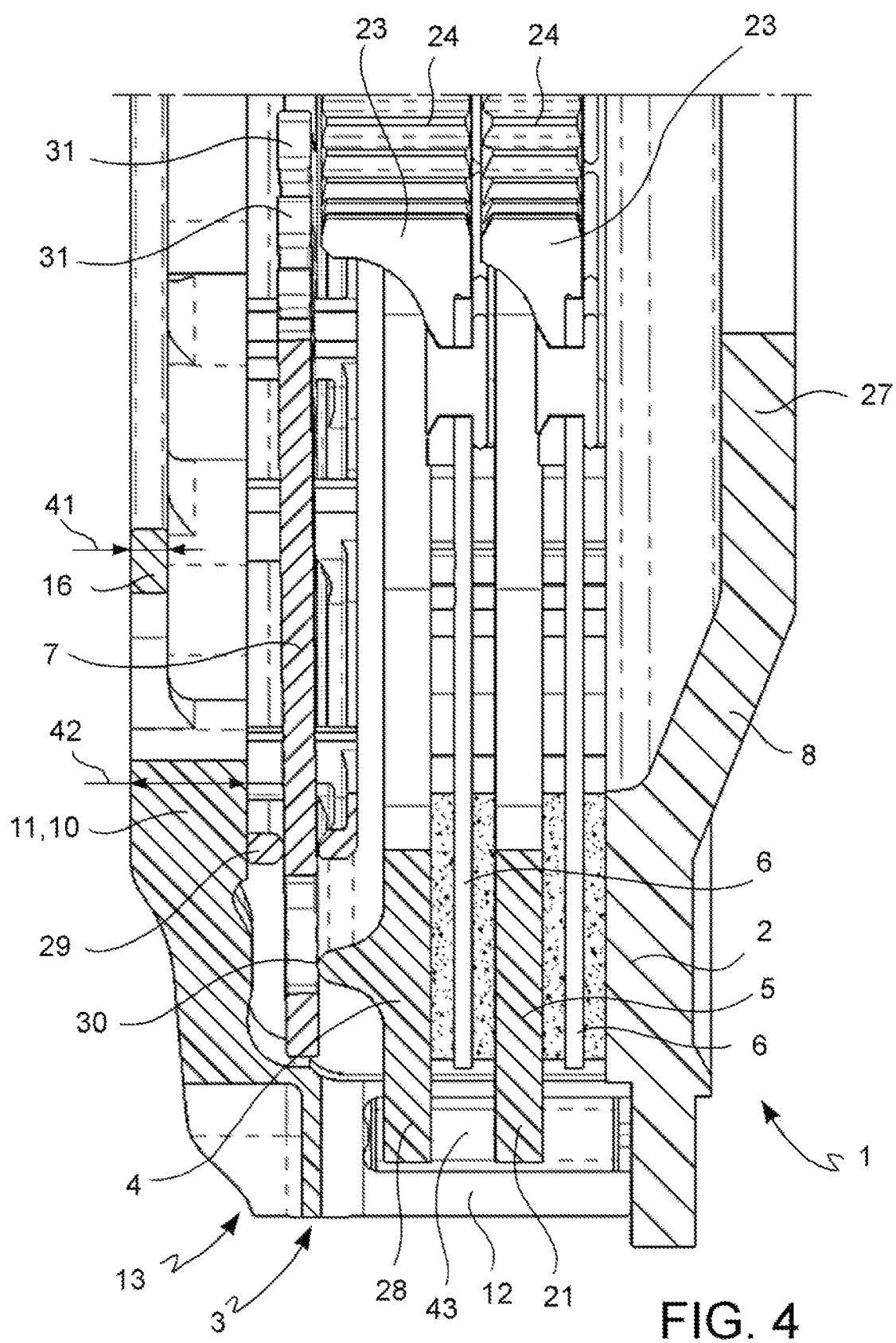
Figure 5:
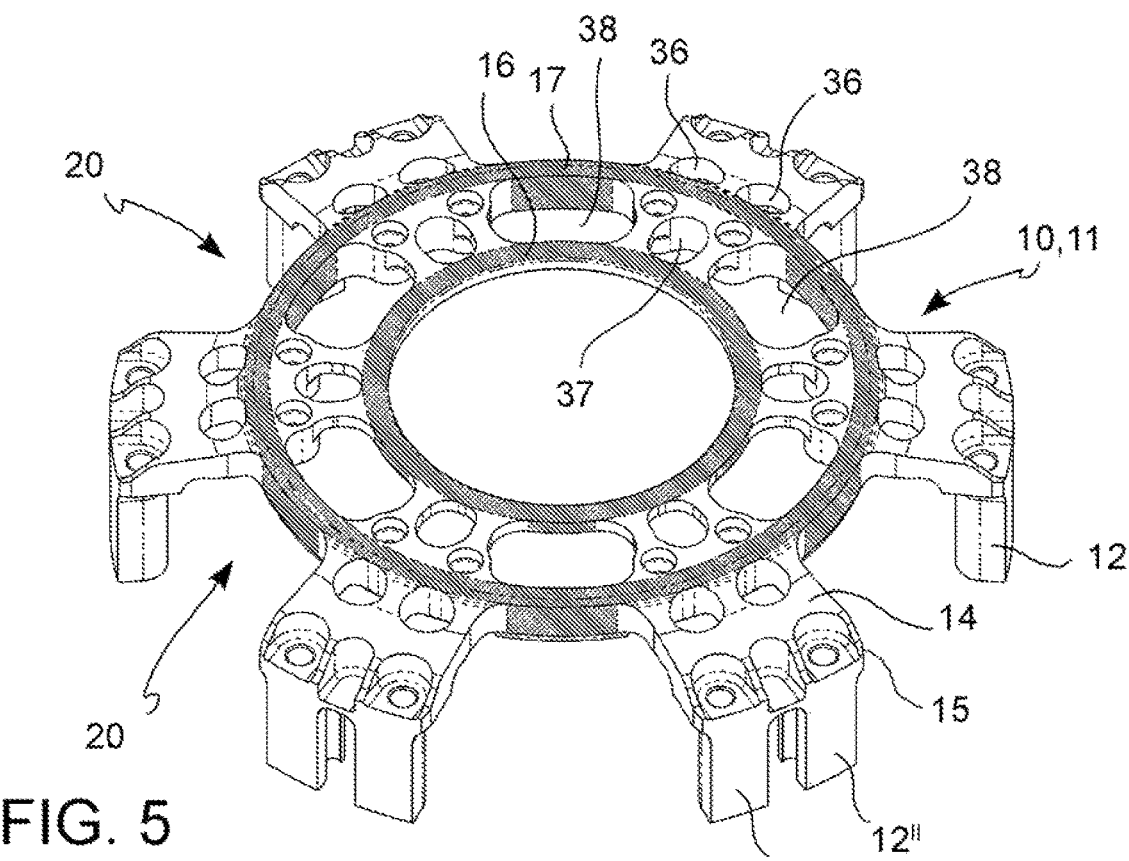
Figure 6:
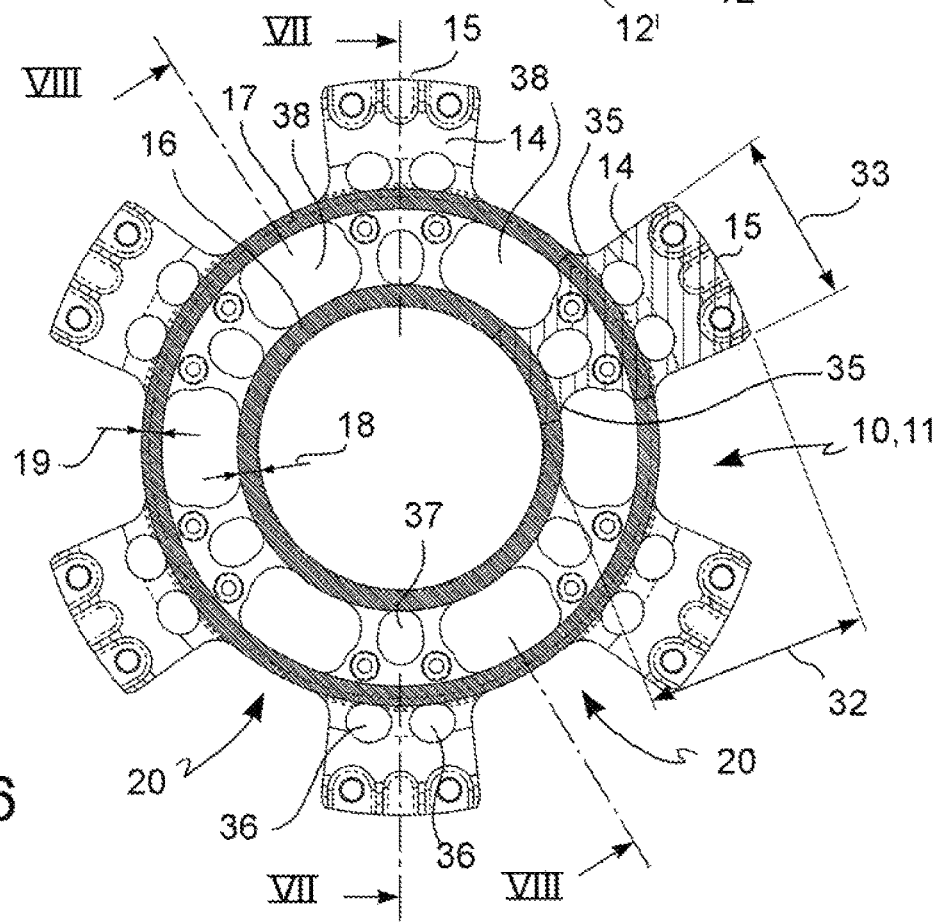
Figures 7, 8:
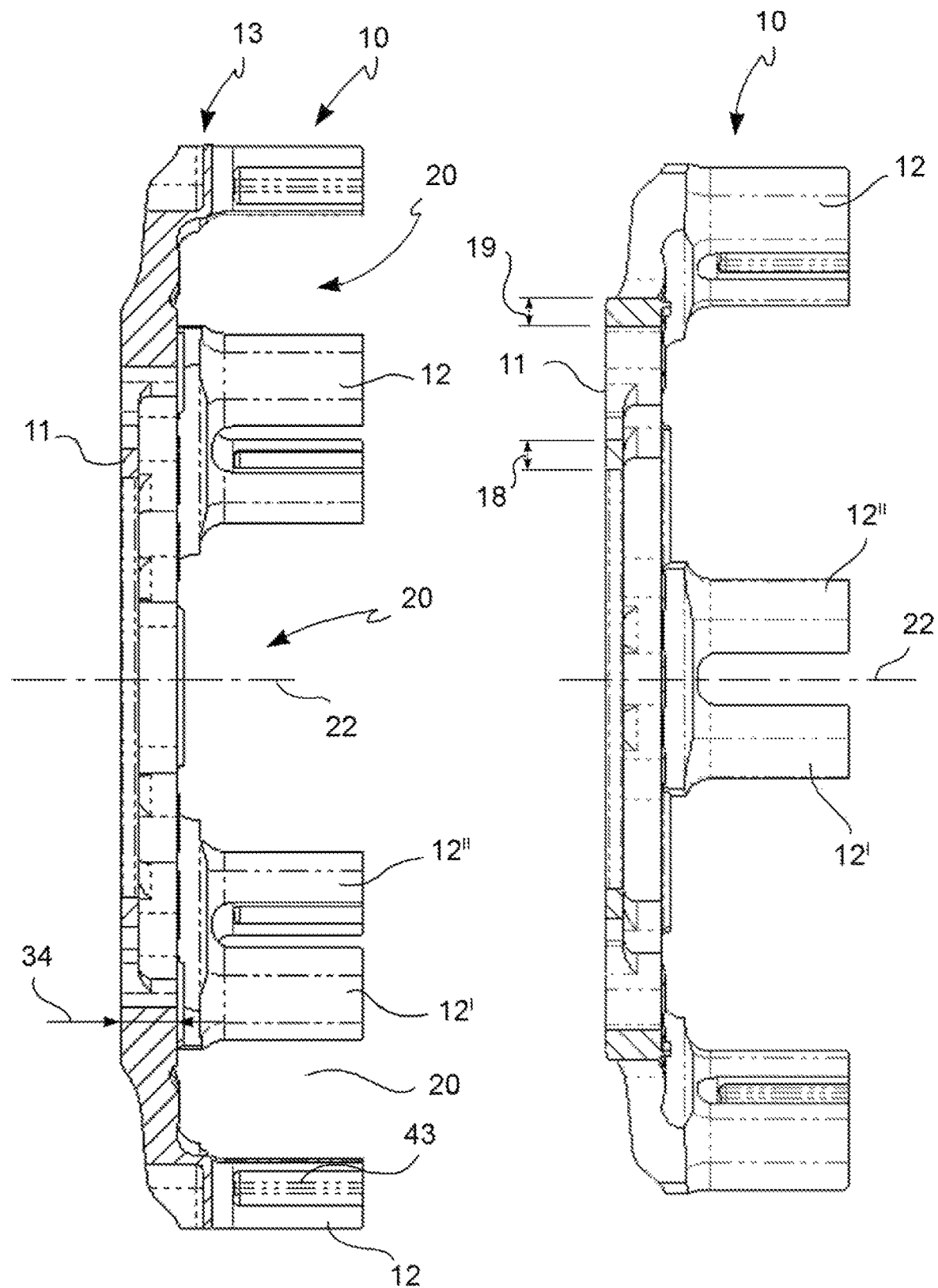
Figure 9:
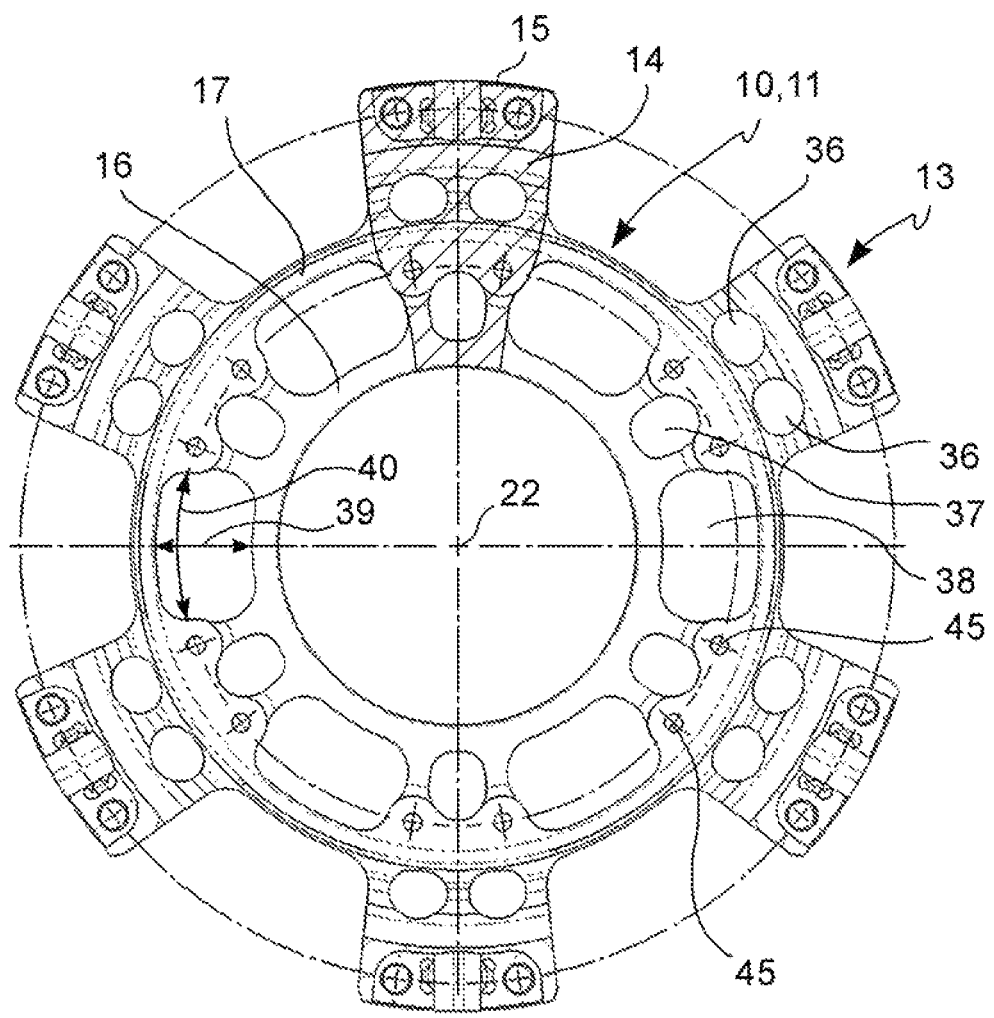
Figure 10:
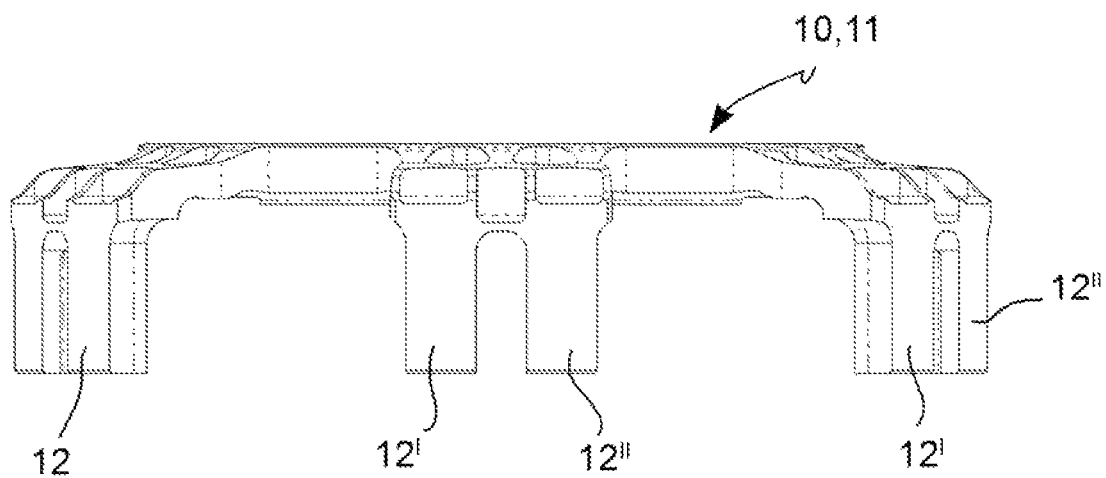
Figure 11:
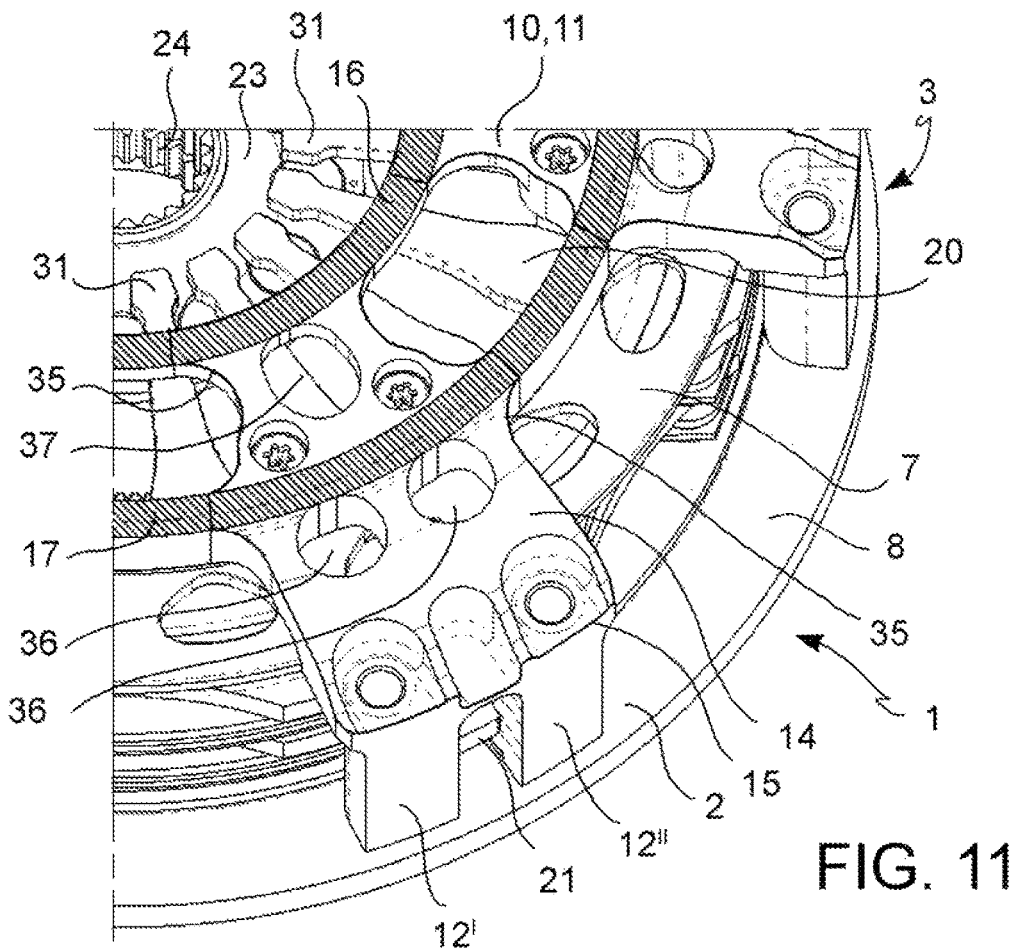
Figure 12:
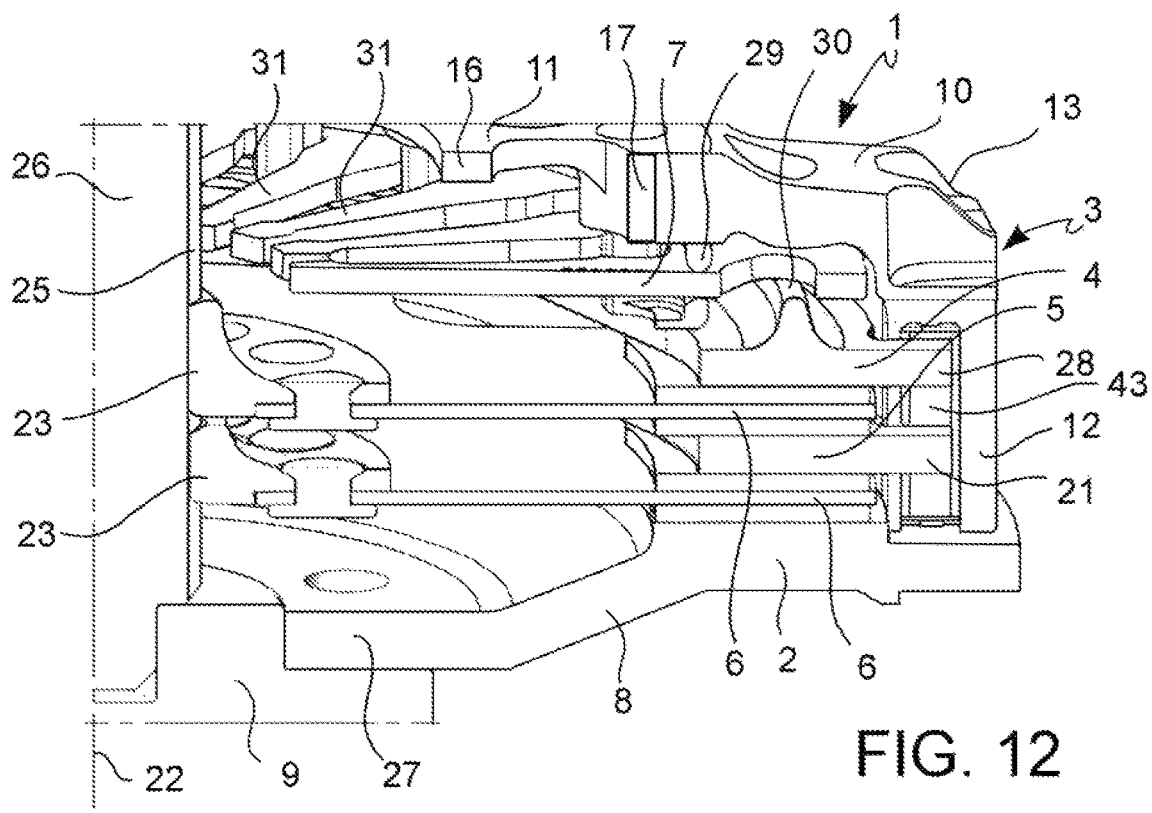

FIG. 1 is a perspective, cross-sectional view of a friction clutch according to an embodiment, FIG. 2 is a perspective, anterior-lateral view of the friction clutch of FIG. 1, FIG. 3 is an exploded perspective view of the friction clutch of FIG. 1, FIG. 4 is a radial cross-section view of the friction clutch of FIG. 1, FIG. 5 is a perspective view of a clutch cover for a friction clutch according to an embodiment, FIG. 6 is an outside plane view of the clutch cover in FIG. 5, FIG. 7 is a radial cross-section view of the clutch cover in a sectional plane VII in FIG. 6, FIG. 8 is a radial cross-section view of the clutch cover in a sectional plane VIII in FIG. 6, FIG. 9 is an inside plane view of the clutch cover in FIG. 5, FIG. 10 is a side view of the clutch cover in FIG. 5, FIGS. 11 and 12 show enlarged details of the friction clutch according to embodiments of the invention.

With reference to the figures, a friction clutch 1 comprises:
a counter-pressure member 2,
a clutch housing 3 rotationally fixed with the counter-pressure member 2,
a pressure plate 4 rotationally fixed with the clutch housing 3 but movable in an axial direction of the friction clutch 1 relative to the clutch housing 3,
at least one friction plate 5, 6 between the pressure plate 4 and the counter-pressure member 2,
at least one clutch spring 7 operative between the clutch housing 3 and the pressure plate 4 to urge the pressure plate 4 towards the counter-pressure member 2 so as to clamp the at least one friction plate 5, 6 between the pressure plate 4 and the counter-pressure member 2, in which the clutch housing 3 comprises:
a radially extending annular plate member 8 intended to be coupled in driving engagement with an engine output shaft 9,
a clutch cover 10 forming a radially extending ring wall 11 positioned opposite to the annular plate member 8 and a plurality of circumferentially spaced drive members 12 extending axially from a radially outer region 13 of the ring wall 11 towards the annular plate member 8, wherein free ends of the drive members 12 are secured to the annular plate member 8, wherein the ring wall 11 forms:

a plurality of circumferentially spaced radially extending plates 14 having each a radially outer end 15, two or more concentric annular stiffening bands 16, 17 extending at a radial distance from one another (with respect to a clutch axis 22) and including an innermost annular stiffening band 16 and an outermost annular stiffening band 17, said annular stiffening bands 16, 17 connecting said radial plates 14 to each other and having each a radial thickness 18, 19 that is smaller than the radial distance therebetween measured in intermediate regions 20 of the ring wall 11 outside said (or circumferentially between respectively two successive) radial plates 14, wherein said drive members 12 protrude axially from said radially outer ends 15 of the radial plates 14.

Alternatively, the clutch cover may form only the radially extending ring wall 11 positioned opposite to the annular plate member 8, whereas the drive members 12 extend axially from a radially outer region of the annular plate member 8 towards the ring wall 11 and the free ends of the axially extending drive members 12 are secured to the ring wall 11.

In both alternative configurations, the thus configured clutch 1 has an increased stiffness of the clutch cover 10 and clutch housing 3 for a given mass, hence improving controllability of the clutch operation during launches of the vehicle. On the other hand, the thus configured clutch cover 10 and clutch housing 3 achieve a reduction of their mass for a given required clutch housing stiffness and therefore an overall performance gain for the vehicle.

Detailed Description of the Clutch Cover 10

In accordance with an embodiment, the (e.g. six) radial plates 14 are arranged at a, preferably constant, angular or circumferential pitch and have each a total or maximum radial extension 32, a total or maximum circumferential extension 33 and a maximum axial thickness 34, wherein:

the maximum radial extension 32 is in the range from 5 to 8 times (e.g. 5.9 times) the maximum axial thickness 34, the maximum circumferential extension 33 is in the range from 3 to 5 (e.g. 4.2 times) times the maximum axial thickness 34.

In an embodiment, the axial thickness 34 of the radial plates 14 decreases from the radially outermost annular stiffening band 17 towards the radially outer end 15 and, preferably, also from the radially outermost annular stiffening band 17 towards the radially innermost annular stiffening band 16.

In other words, the axial thickness 34 of the radial plates 14 is maximum at the radially outermost annular stiffening band 17.

This configuration increases the stiffness of the clutch cover 10 against undesired load dependent variation of the clutch housing 3 axial dimensions.

In an embodiment, the circumferential extension (width) 33 of the radial plates 14 increases from the radially outermost annular stiffening band 17 towards the radially outer end 15 and, preferably, decreases from the radially outermost annular stiffening band 17 towards the radially innermost annular stiffening band 16.

In other words, the circumferential extension (width) 33 of the radial plates 14 is maximum at the radially outer end 15 and minimum at the radially innermost annular stiffening band 16, with the only exception of possible locally rounded corner regions 35 that form a smooth transition between the radial plates 14 and the annular stiffening bands 16, 17.

Advantageously, the radial plates 14 have each a first section spanning radially between the outermost annular stiffening band 17 and the innermost annular stiffening band 16, and a second section spanning radially from the outermost annular stiffening band 17 to the radially outer end 15, wherein the radial extension of the second section is greater than 50%, preferably in the range from 75% to 120%, still preferably from 85% to 105% of the radial extension of the first section. In a preferred embodiment, the radial extension of the second section is 93.6% of the radial extension of the first section measured from the inner diameter of the innermost stiffening band 16 to the outer diameter of the outermost stiffening band 17.

In other words, the radial extension of the radial plates 14 externally beyond the outermost stiffening band 17 is greater than half the radial distance between the innermost annular stiffening band 16 and the outermost annular stiffening band 17.

This reduces significantly the mass and the mass inertial moment of the clutch cover 10 for a given stiffness against axial deformations.

The individual radial plates 14 can each form one or more mass reduction apertures, such as e.g. one or two outer through holes 36 positioned in the second section radially outside the outermost annular stiffening band 17 and/or at least one inner through hole 37 positioned in the first section between the innermost and outermost annular stiffening bands 16, 17, thereby further reducing the mass and the mass inertial moment of the clutch housing.

In the intermediate region 20 between successive radial plates 14, the ring wall 11 is constituted by substantially only the concentric annular stiffening bands 16, 17 which define a (preferably single) circumferentially extending through opening 38 therebetween.

The through opening 38 creates a free radial distance 39 between the concentric annular stiffening bands 16, 17 and a free circumferential distance 40 between bordering successive radial plates 14 in said intermediate region 20.

In a preferred embodiment, the free radial distance 39 between the concentric annular stiffening bands 16, 17 is greater than one fourth (25%) of the maximum radial extension 32 of the radial plates 14, preferably in the range of 30% to 37%, e.g. 33.7% of the maximum radial extension 32 of the radial plates 14.

In an also preferred embodiment, the free circumferential distance 40 between bordering successive radial plates 14 is greater than 50%, preferably greater than 75%, even more preferably 104% (measured at the circumference at which the housing bolts are arranged) of the circumferential extension 33 of the radial plates 14 measured along the same circumference.

These geometric relationships make the ring wall 11 effectively a lightweight frame structure of distinct radial and circumferential stiffening members.

In the intermediate region 20 between successive radial plates 14, the outermost annular stiffening band 17 has an axial thickness 42 larger than its radial thickness 19, preferably ranging from 1.5 times to 2.2 times, e.g. approximately 2 times, even more preferably 1.91 times, the radial thickness 19.

In the same intermediate region 20 between successive radial plates 14, the innermost annular stiffening band 16 has an axial thickness 41 smaller than its radial thickness 18, preferably ranging from 0.7 times to 0.45 times, e.g. approximately 0.5 times, even more preferably 0.58 times, the radial thickness 18.

Advantageously, the outermost annular stiffening band 17 has an axial thickness 42 larger than the axial thickness 41 of the innermost annular stiffening band 16, preferably ranging from 2 to 4 times, e.g. approximately 3 times, even more preferably 3.14 times, the axial thickness 41 of the innermost annular stiffening band 16.

Advantageously, the outermost annular stiffening band 17 has a radial thickness 19 in a range from 0.8 to 1.2 times, approximately 1.0 times, preferably 1.04 times, the radial thickness 18 of the innermost annular stiffening band 16.

Each drive member 12 may form a pair of substantially parallel drive legs 12', 12" spaced apart and carrying a wear plate 43 for engaging (the radially external lugs 21 of) the drive plate/s 5 therebetween.

The drive members 12 are formed as a single piece together with the associated radial plate 14 and can be fixed to the annular plate member 8 by housing fixing screws inserted in axial through holes formed in the drive members 12, e.g. in each one of the drive legs 12', 12", and screwed in threaded axial holes in the annular plate member 8 near its outer diameter.

The clutch cover 10 is advantageously made as a single piece made from aluminium alloy, but the described geometry has proven to achieve an efficient design in terms of mass and stiffness that could also be beneficially applied in an application where high temperature prohibited the use of aluminium and where the clutch cover 10 is instead in steel or titanium or alloys thereof.

Detailed Description of the Clutch 1 Assembly

In accordance with an embodiment, the annular plate member 8 extends from a driving flange 27 which is configured for driving engagement with the engine output shaft 9, so that the clutch housing 3 rotates together with the engine output shaft 9 about a the common axis (clutch axis 22).

In accordance with an embodiment, the friction plates 5, 6 located within the clutch housing 3 may comprise a stack of driving friction plate/s 5 and driven friction plate/s 6.

The drive plates 5 have radially outwardly extending lugs 21 on their outer diameter which locate between the axial drive members 12 so that they are constrained to rotate with the clutch housing 3 about a clutch axis 22 (which corresponds to the engine output shaft 9 axis), but are moveable relative to the clutch housing 3 in the axial direction of clutch axis 22.

The driven plates 6 are interleaved between the drive plates 5 (or vice versa) and each driven plate 6 may be mounted to a driven hub 23 so that the driven hub 23 is constrained to rotate with the driven plates 6 and vice versa about the clutch axis 22.

The driven hub 23 and/or the driven plates 6 are adapted for being rotationally fixed mounted on a clutch output shaft 26 that may be an input shaft of an associated gearbox (not shown).

The driven hub 23 and/or the driven plates 6 are arranged so as to be movable in an axial direction of the clutch 1 relative to the clutch housing 3. For this purpose, the driven hub 23 and/or the driven plates 6 may have e.g. internal splines 24 engaging with external splines 25 of the clutch output shaft 26.

The pressure plate 4 is located between the stack of friction plates 5, 6, and the clutch cover 10. The pressure plate 4 has radially extending teeth 28 on its outer diameter for engagement with the drive members 12 so that the pressure plate 4 is constrained to rotate with the clutch housing 3 about the clutch axis 22 whilst being able to move in the direction of the clutch axis 22 relative to the housing.

The clutch spring 7 may comprise a diaphragm spring which acts between and abuts against a cover pivot line 29 on the clutch cover 3 and a plate pivot line 30 on the pressure plate 4. The cover pivot line 29 can be formed integral with the clutch cover 3 or may be embodied by a circumferential pivot wire 29 mounted on an internal side of the clutch cover 3, e.g. at the ring wall 11, facing the clutch spring 7. The plate pivot line 30 can be formed by a circumferential projection 30 formed on a side of the pressure plate 4 facing the clutch spring 7.

The clutch spring/s 7 are held in position by a location retainer ring 44 fastened by means of spring retaining screws 45 to the clutch housing 3, especially to ring wall 11.

When the friction clutch 1 is engaged, the clutch spring 7 biases the pressure plate 4 towards the annular plate member 8 so as to clamp the driving friction plates 5, and driven friction plate/s 6 between the pressure plate 4 and an internal face of the annular plate member 8 that constitutes the counter-pressure member 2. In this embodiment, the clutch spring 7 is a single diaphragm 7 but the clutch spring 7 could comprise two or more spring members.

The annular plate member 8 may form a flywheel or may be formed by a flywheel attached to the engine output shaft 9.

The friction clutch 1 may implement a so-called "push-type" clutch in which the cover pivot line 29 on the clutch housing 3 is radially more inward than the plate pivot line 30 so that, in order to release or disengage the clutch, a number of radially inwardly projecting release fingers 31 of the spring 7 are pushed towards an inside of the clutch by a release bearing (not illustrated). However, the invention can be equally applied to so-called "pull-type" clutches in which the cover pivot line 29 on the clutch housing 3 is radially more external than the plate pivot line 30 so that, in order to release or disengage the clutch, the radially inwardly projecting release fingers 31 of spring 7 are pulled towards an outside of the clutch by the release bearing.

When the clutch 1 is engaged and the whole of the available spring force is applied to the pressure plate 4, the clamp load will be substantially equal to the available spring 7 force, subject to any losses in the system due to friction and possible opposing spacer spring forces. When the clutch 1 is only partially engaged, the release bearing engages with the spring release fingers 31 to hold the spring in a partially engaged position so that only a proportion of the available spring 7 force is applied to the pressure plate 4.

In an alternative embodiment (a so called reversed internals clutch), the clutch 1 could be configured so that the driving plate/s 5, and driven friction plate/s 6 are clamped against a face on the clutch cover 10 rather than the annular plate member 8. In this arrangement, the clutch cover 10 would form or support the counter-pressure member 2. The pressure plate 4 and clutch spring 7 would then be located between the stack of friction plates 5, 6 and the annular plate member 8 with no cover pivot line 29 at the clutch cover, but a clutch housing pivot line on the annular plate member 8.

The references "radial" and "axial", circumferential" and "concentric" with regard to direction, extension, orientation, displacement and position are to be construed as referred to the clutch axis 22 which can, and in preferred embodiments do, coincide with the rotational axis of the clutch components and with the rotational axis of the engine output shaft 9 as well as with the rotational axis of the clutch output shaft 26.

The terminology "free end" doesn't require that the free end is necessarily without any contact to other components. Instead "free end" denotes an end portion of a single piece component which, however, can be connected e.g. by screws to another single piece component of the clutch.

The foregoing embodiments are not intended to limit the scope of protection afforded by the claims, but rather to describe an example as to how the invention may be put into practice.

The invention claimed is:

1. A friction clutch comprising:
   a counter-pressure member,
   a clutch housing rotationally fixed with the counter-pressure member,
   a pressure plate rotationally fixed with the clutch housing but movable in an axial direction of the friction clutch relative to the clutch housing,
   at least one friction plate between the pressure plate and the counter-pressure member,
   at least one clutch spring operative between the clutch housing and the pressure plate to urge the pressure plate towards the counter-pressure member so as to clamp the at least one friction plate between the pressure plate and the counter-pressure member,
   in which the clutch housing comprises:
   a radially extending annular plate member intended to be coupled in driving engagement with an engine output shaft,
   a clutch cover forming a radially extending ring wall positioned opposite to the annular plate member and a plurality of circumferentially spaced drive members extending axially from a radially outer region of the ring wall towards the annular plate member, wherein ends of the drive members are secured to the annular plate member,
   wherein the ring wall forms:
   a plurality of circumferentially spaced radially extending plates having each a radially outer end,
   two or more concentric annular stiffening bands extending at a radial distance from one another and including an innermost annular stiffening band and an outermost annular stiffening band,
      said annular stiffening bands connecting said radial plates to each other, wherein the annular stiffening bands each have a radial thickness that is smaller than the radial distance therebetween measured in intermediate regions of the ring wall between respectively two successive radial plates,
      wherein said drive members protrude axially from said radially outer ends of the radial plates.

2. A friction clutch according to claim 1, wherein said radial plates form each one or more mass reduction apertures.

3. A friction clutch according to claim 2, wherein said mass reduction apertures comprise two outer through holes positioned radially outside the outermost annular stiffening band and at least one inner through hole positioned between the innermost and outermost annular stiffening bands.

4. A friction clutch according to claim 1, wherein in the intermediate region between successive radial plates the ring wall is constituted by substantially only the concentric annular stiffening bands which define a single circumferentially extending through opening therebetween.

5. A friction clutch according to claim 4, wherein said through opening creates a free radial distance between the concentric annular stiffening bands and a free circumferential distance between bordering successive radial plates in said intermediate region,
   said free radial distance between the concentric annular stiffening bands is greater than one fourth of the maximum radial extension of the radial plates, and
   said free circumferential distance between bordering successive radial plates is greater than 50%, or greater than 75%, of the circumferential extension of the radial plates measured along a same circumference.

6. A friction clutch according to claim 1, wherein in the intermediate region between successive radial plates, the outermost annular stiffening band has an axial thickness larger than its radial thickness.

7. A friction clutch according to claim 6, wherein the axial thickness of the outermost annular stiffening band is selected in the group consisting of:
   from 1.5 times to 2.2 times the radial thickness,
   two times the radial thickness.

8. A friction clutch according to claim 1, wherein in the intermediate region between successive radial plates, the innermost annular stiffening band has an axial thickness smaller than its radial thickness.

9. A friction clutch according to claim 8, wherein the axial thickness of the innermost annular stiffening band is selected in the group consisting of:
   from 0.7 times to 0.045 times the radial thickness,
   half the radial thickness.

10. A friction clutch according to claim 1, wherein in the intermediate region between successive radial plates the outermost annular stiffening band has an axial thickness larger than an axial thickness of the innermost annular stiffening band.

11. A friction clutch according to claim 10, wherein the axial thickness of the outermost annular stiffening band is selected in the group consisting of:
   from two to four times the axial thickness of the innermost annular stiffening band,
   three times the axial thickness of the innermost annular stiffening band.

12. A friction clutch comprising:
   a counter-pressure member,
   a clutch housing rotationally fixed with the counter-pressure member,
   a pressure plate rotationally fixed with the clutch housing but movable in an axial direction of the friction clutch relative to the clutch housing,
   at least one friction plate between the pressure plate and the counter-pressure member,
   at least one clutch spring operative between the clutch housing and the pressure plate to urge the pressure plate towards the counter-pressure member so as to clamp the at least one friction plate between the pressure plate and the counter-pressure member,
   in which the clutch housing comprises:
   a radially extending annular plate member intended to be coupled in driving engagement with an engine output shaft,
   a clutch cover forming a radially extending ring wall positioned opposite to the annular plate member,
   a plurality of circumferentially spaced drive members extending axially toward a radially outer region of the annular plate member, wherein ends of the axially extending drive members are secured to the ring wall,
   wherein the ring wall forms:

a plurality of circumferentially spaced radially extending plates having each a radially outer end, two or more concentric annular stiffening bands extending at a radial distance from one another and including an innermost annular stiffening band and an outermost annular stiffening band, said annular stiffening bands connecting said radial plates to each other, wherein the annular stiffening bands each have a radial thickness that is smaller than the radial distance therebetween measured in intermediate regions of the ring wall between respectively two successive radial plates, wherein said drive members protrude axially from said radially outer ends of the radial plates.

13. A friction clutch according to claim 12, wherein the radial plates are arranged at a constant angular pitch and have each a radial extension, a circumferential extension and an axial thickness, wherein:

a maximum radial extension is in the range from 5 to 8 times a maximum axial thickness, a maximum circumferential extension is in the range from 4 to 6 times the maximum axial thickness.

14. A friction clutch according to claim 12, wherein an axial thickness of the radial plates is maximum at the radially outermost annular stiffening band and said axial thickness decreases from the radially outermost annular stiffening band towards the radially outer end and said axial thickness decreases also from the radially outermost annular stiffening band towards the radially innermost annular stiffening band.

15. A friction clutch according to claim 12, wherein a circumferential width of the radial plates increases from the radially outermost annular stiffening band towards the radially outer end, with the only exception of possible locally rounded corner regions that form a smooth transition between the radial plates and the annular stiffening bands and said circumferential width of the radial plates decreases from the radially outermost annular stiffening band towards the radially innermost annular stiffening band, with the only exception of the possible locally rounded corner regions that form a smooth transition between the radial plates and the annular stiffening bands.

16. A friction clutch according to claim 12, wherein the radial plates have each a first section spanning radially between the outermost annular stiffening band and the innermost annular stiffening band, and a second section projecting radially from the outermost annular stiffening band to the radially outer end, wherein the radial extension of the second section is greater than 50%, or in the range from 75% to 120%, or in the range from 85% to 105%, of the radial extension of the first section.

17. A friction clutch according to claim 12, wherein in the intermediate region between successive radial plates, the outermost annular stiffening band has a radial thickness in a range from 0.8 to 1.2 times a radial thickness of the innermost annular stiffening band.

18. A friction clutch according to claim 12, wherein said clutch cover is a single piece made from aluminum alloy.

19. A clutch cover for a friction clutch, said clutch cover forming a ring wall radially extending with respect to a clutch axis, wherein said ring wall forms:

a plurality of circumferentially spaced radially extending plates having each a radially outer end, two or more concentric annular stiffening bands extending at a radial distance from one another and including an innermost annular stiffening band and an outermost annular stiffening band, said annular stiffening bands connecting said radial plates to each other and said annular stiffening bands having each a radial thickness that is smaller than the radial distance therebetween measured in intermediate regions of the ring wall between respectively two successive radial plates, wherein a plurality of circumferentially spaced drive members of the friction clutch are connected to and protrude axially from or can be screw connected to said radially outer ends of the radial plates.

* * * * *

UNITED STATES PATENT AND TRADEMARK OFFICE
CERTIFICATE OF CORRECTION

PATENT NO. : 11,725,700 B2
APPLICATION NO. : 17/609142
DATED : August 15, 2023
INVENTOR(S) : David James Constable-Berry and Jonathan David Grant It is certified that error appears in the above-identified patent and that said Letters Patent is hereby corrected as shown below:

In the Claims

Claim 19, Column 12, Line 37, should read as follows:
protrude axially from said Signed and Sealed this
Seventeenth Day of October, 2023

Katherine Kelly Vidal
*Director of the United States Patent and Trademark Office*